United States Patent [19]

Petry

[11] Patent Number: 4,933,954
[45] Date of Patent: Jun. 12, 1990

[54] DEVICE FOR RECOMBINATION OF A MESSAGE TRANSMITTED BY A FREQUENCY HOPPING TRANSMITTER

[75] Inventor: Karl-Heinz Petry, Taufkirchen, Fed. Rep. of Germany

[73] Assignee: Rohde & Schwarz GmbH & Co. KG, Fed. Rep. of Germany

[21] Appl. No.: 887,531

[22] Filed: Jun. 16, 1986

[30] Foreign Application Priority Data

Jun. 20, 1985 [DE] Fed. Rep. of Germany ....... 3521996

[51] Int. Cl.$^5$ .............................................. H04L 9/00
[52] U.S. Cl. ......................................... 375/1; 380/34
[58] Field of Search ..................... 375/1.0, 89; 380/34; 329/50, 124

[56] References Cited

U.S. PATENT DOCUMENTS 4,518,922  5/1985  Luecke ................................ 329/124
4,601,005  7/1986  Kilvington ............................. 375/1

Primary Examiner—Salvatore Cangialosi
Attorney, Agent, or Firm—Hill, Van Santen, Steadman & Simpson

[57] ABSTRACT

For recombining a message transmitted by a frequency hopping transmitter at a fast changing transmitting frequency, there are used a digital FFT search receiver for cyclically evaluating the frequency band occupied by the frequency hopping transmitter, at least one interception receiver capable of being switched by the FFT search receiver to the respective instantaneously used transmitting frequency of the frequency hopping transmitter, and a digital storage in which the stream of digital output data from the output of the permanently operative analog-to-digital converter of the FFT search receiver is temporarily stored, the delayed stream of output data from the storage being supplied to the input of the interception receiver.

4 Claims, 4 Drawing Sheets

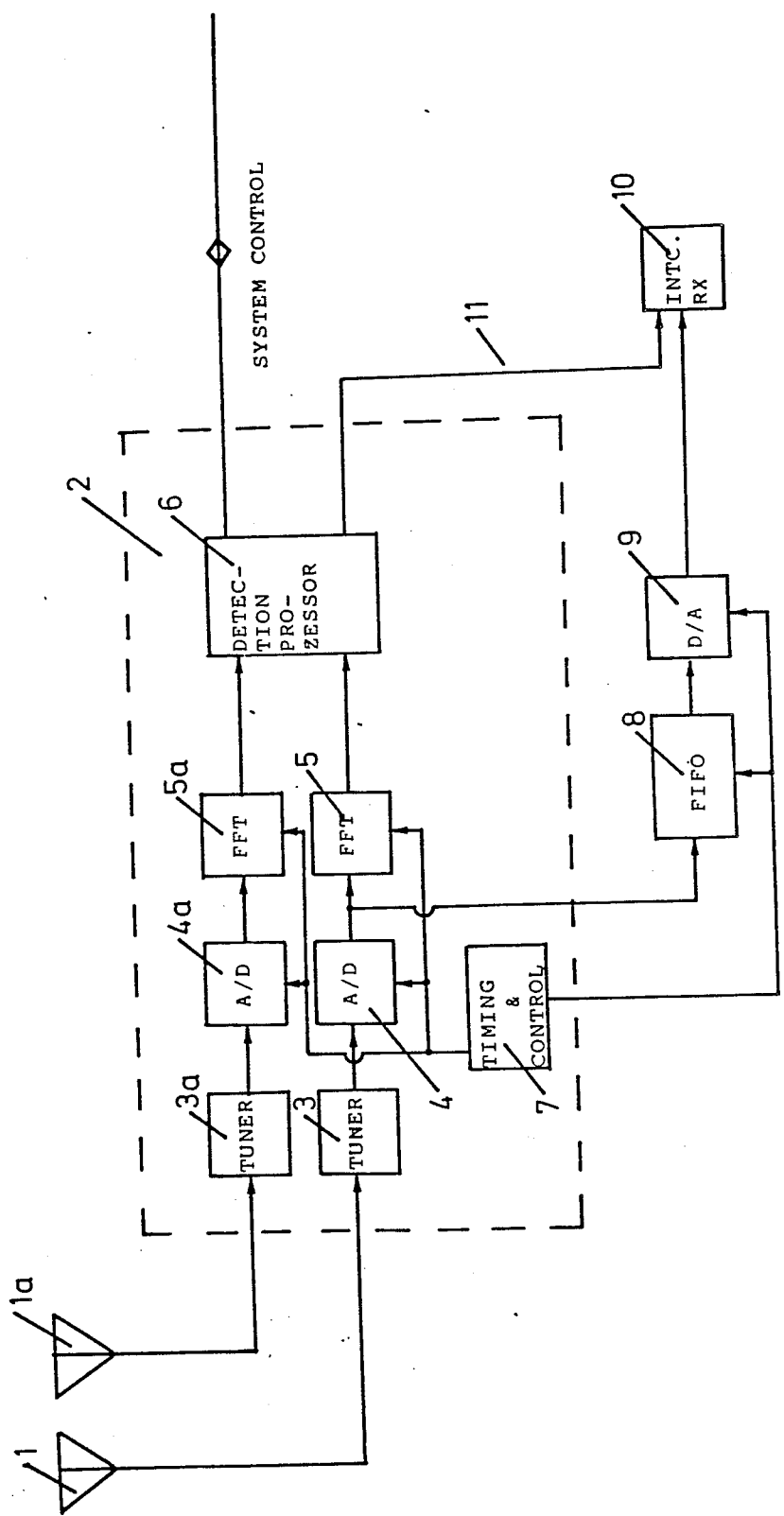

DEVICE FOR RECOMBINATION OF A MESSAGE TRANSMITTED BY A FREQUENCY HOPPING TRANSMITTER

The invention concerns a system as specified in the preamble of the main claim.

In the communications field, so-called frequency hopping transmitters are used to prevent unauthorized interception of a message, said transmitters transmitting the message at fast changing transmitting frequencies on the basis of a frequency pattern which is known only to the authorized receiver (U.S. Pat. No. 4,023,103). With the frequency pattern of the frequency hopping transmission being unknown, the message can only be evaluated by providing a separate receiver for each frequency channel used by the frequency hopping transmitter which, however, would constitute an unacceptably great design effort; or the frequency band occupied by the frequency hopping transmitter would have to be permanently monitored as with a spectral analyzer by a suitable search receiver, and an interception receiver associated with the respective frequency hopping transmission would have to be set to the instantaneously used transmitting frequency in response to the output data from the search receiver via suitable evaluating means. When the frequency hopping transmitter operates at a high hopping rate the dead-time of the system required by the search receiver for monitoring the frequency band and for evaluating and outputting the output data inclusive of the setting time for the interception receiver may amount to more than 50% of the respective dwell time of the frequency hopping transmitter, so that useful evaluation and recombination of the frequency hopping transmission are no longer possible.

It is the object of the present invention to provide a simple system for the recombination of a frequency hopping transmission, wherein said drawback is eliminated and a practically complete recombination of the transmitted message is possible in spite of the system dead-time even though the switching program of the transmitter is unknown at the receiving end.

Proceeding from a system as specified in the preamble of the main claim, the above-specified object is solved by the features set out in the characterizing part of the main claim. Advantageous further improvements will be apparent from the subclaims.

The system according to the instant invention proceeds from the realization that a search receiver which operates digitally on the principle of the so-called fast Fourier transformation (FFT) allows monitoring of a relatively wide frequency band within minimum time, and that it is further possible by means of a suitable fast detection processor to determine very quickly at what frequencies a given frequency hopping transmitter successively transmits its message. Such digital FFT receivers make it possible, after detection of the respectively used transmitting frequency, to switch the actual interception receiver equally quickly to said transmitting frequency. The time required for detecting the instantaneous transmitting frequency and for the subsequent switching of the interception receiver is lost for the message evaluation as system dead-time. For this reason the invention provides for additional temporary storage of the input signal of the monitoring receiver so that after the system dead-time the initially applied input signal is fully available to the interception receiver and may be evaluated accordingly. For said storage of the initial input signal the invention utilizes a portion of the structure of the FFT search receiver, i.e. the signal processing portion provided up to the analog-to-digital converter of the digital FFT search receiver through which the analog input signal is converted to a stream of digital output data. It is thus possible to use a simple digital storage for the desired temporary storing of the input signal, whereby the overall structure of the system is highly simplified. When analog interception receivers are used it will only be necessary to reconvert the stream of output data from the digital temporary storage by means of an additional simple digital-to-analog converter to an analog signal which is time-delayed with respect to the initial input signal and which may then be fully evaluated in the interception receiver. When the interception receivers are digital receivers, in which the complete frequency synthesizing and evaluation is performed digitally, said additional digital-to-analog converter may of course be omitted, and in that case the output of the digital temporary storage is directly connected to the digital input of the digital interception receiver. The storage time of the digital temporary storage is suitably selected to be exactly equal to the dead-time of the overall system, i.e. as long as the time required by the FFT search receiver for searching the frequency band and for determining the respectively used transmitting frequency of the frequency hopping transmitter, inclusive of the time required for setting the associated interception receiver to the detected frequency in response to the FFT search receiver. In that case no part of the message will be lost, because the correspondingly time-delayed associated input signal will be available from the start for evaluation at the input of the interception receiver when the same is switched to the new transmitting frequency.

When the dwell time of the frequency hopping transmitter (duration of a message transmitted at a transmitting frequency) is shorter than the system cycle time necessary for producing a complete output record in the FFT search receiver, unavoidable gaps will necessarily result in the recombined signal. Gaps will also result when the dwell time of the frequency hopping transmitter is longer than or equal to said system cycle time. In accordance with a further improvement of the invention in accordance with subclaim 4 such gaps may be prevented by merely extending the storage volume of the digital storage by a full system cycle time and by associating an additional logic circuit with the interception receiver. In this way it is possible to achieve a recombination of a frequency hopping transmission without any gaps.

Embodiments of the invention will be described hereinbelow with reference to the accompanying schematic drawings.

FIG. 4 shows the principles of the invention in an FFT receiver having two or more receiving channels where the additional channel elements are noted with the additional label "a".

Figure 1:
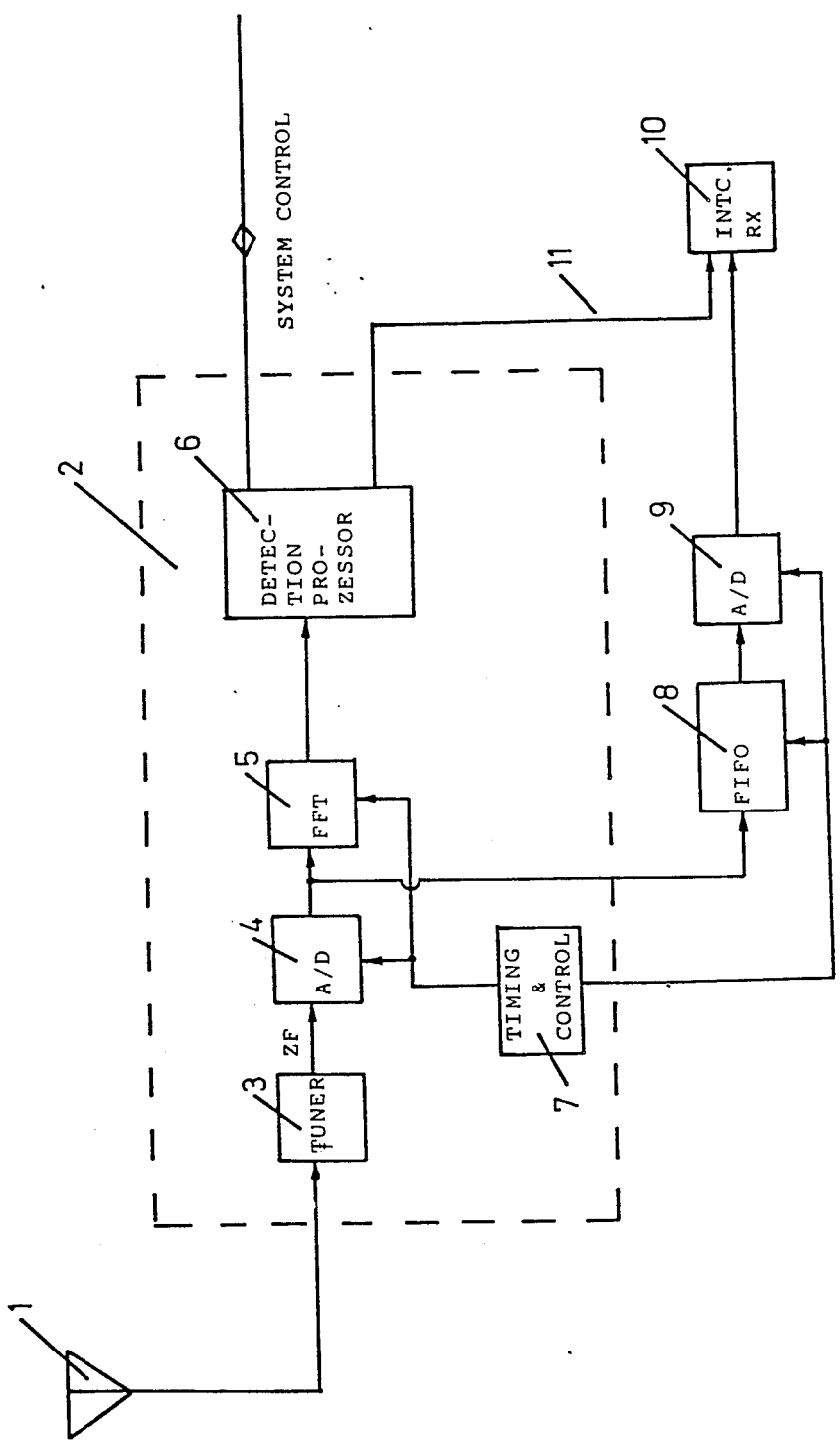
FIG. 1 is the basic circuit diagram of the invention.

FIG. 1 is the basic circuit diagram of a system in accordance with the invention for the recombination of a message transmitted by a frequency hopping transmitter at fast changing transmitter frequencies, said message being received via an antenna 1 and digitally evaluated in an FFT search receiver 2. This FFT search receiver comprises a receiving circuit 3 for wide-band conversion of the entire frequency band occupied by the frequency hopping transmitter to a suitable IF position. This initially analog input signal is then converted in a known manner by a subsequent analog-to-digital converter 4 to a stream of digital output data for evaluation in an FFT processor 5 including a detection processor 6 connected to the output thereof. The analog-to-digital converter 4 and the FFT processor 5 are controlled via a clock generator 7. From the received data the FFT search receiver 2, like a frequency analyzer, determines in a known way within a predetermined time window the instantaneous frequency occupancy of the frequency band occupied by the frequency hopping transmitter, i.e., it determines on the basis of the received digital data the frequency position which the frequency hopping transmitter had at a predetermined system cycle time in which a complete record was outputted by the analog-to-digital converter 4. The rate of this FFT search receiver is designed such that the system cycle time, which is between the generation of two complete output records, is shorter than the dwell time of the frequency hopping transmitter.

Although only a part of the overall available system cycle time is used for the actual FFT evaluation, the analog-to-digital converter 4 operates continually and therefore continually supplies the digital signals corresponding to the input signal. The FFT processor 5 evaluates only a portion of the thus continually generated records, i.e. the processor 5 copies only those records from the stream of data which are required by said processor. The permanent stream of digital output data from the converter 4 is written into a FIFO-type digital storage 8, which may be a shift register. The digital output signal, which is time-delayed in the storage 8, is supplied from the storage 8 to a digital-to-analog converter 9 in which an analog signal again corresponding to the initial analog input signal is formed from the stream of digital data, said analog signal being then supplied to the input of an interception receiver 10 where it is further evaluated.

The frequency setting means of said interception receiver 10 is controlled through the detection processor 6. The digital storage 8 and the converter 9 are controlled by the clock generator 7 so that the organization of the storage 8 is in clock-controlled synchronism with the analog-to-digital conversion cycles of the converter 4. In the illustrated example, the storage time $T_S$ of the digital storage 8 is selected such that it corresponds to the dead-time of the overall system inclusive of the setting time of the interception receiver 10. For spectral analysis, the input data are sampled in the analog-to-digital converter 4 at a sampling frequency which is higher than twice the bandwidth of the frequency range to be monitored (Nyquist theorem). Thus, when the analog-to-digital converter 4 operates continually, its stream of digital output data also comprises the same information as the analog input signals except for distortions and for quantization noise, which depend solely on the word width and the linearity characteristics of the converter. The word width of the digital storage 8 is selected to be equal to or greater than the word width of the analog-to-digital converter 4. Therefore the temporarily stored signal is not corrupted anymore by the temporary storage operation, irrespective of the duration of such temporary storage.

After a predetermined system cycle time the FFT search receiver determines at what instantaneous frequency the frequency hopping transmitter is just transmitting a message. The interception receiver 10 is then tuned to this instantaneous frequency under control by the FFT search receiver. After the system dead-time inclusive of the setting time of the interception receiver 10, the initial input signal is simultaneously also available at the input of the receiver 10 due to the time delay in the intermediate storage 8 following frequency switching of the receiver 10, which means that no part of the message contained in the input signal will be lost by the temporary storage. Thus it is possible also for a message transmitted by the frequency hopping technique to receive the same substantially without any gaps and to evaluate it.

The principle of the invention may be used not only with a single-channel FFT search receiver 2 in accordance with the embodiment illustrated in FIG. 1 but may also be used similarly in an FFT receiver having two or more receiving channels such as can be used, for instance, as monopulse DF receivers. In such a multichannel receiver arrangement the digital data of some or all receiving channels may also be temporarily stored separately and may be supplied separately to the interception receivers. Connection of the interception receivers is then made by additional selection of the receiving channel which provides the maximum signal level at the desired receiving frequency. FIG. 4 shows a possible example thereof.

Figure 2:
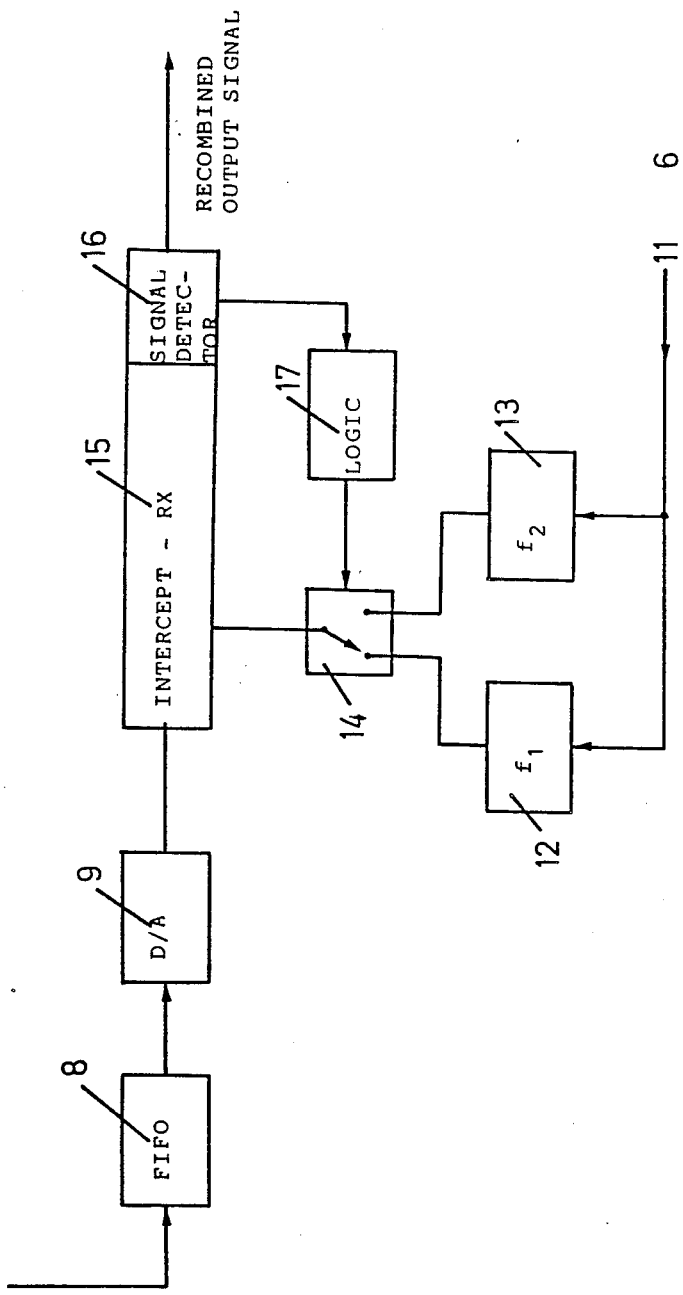
FIG. 2 illustrates receiver 10 more particularly.

FIG. 2 illustrates an exemplification of the interception receiver 10 according to the invention. The interception receiver illustrated in FIG. 2 comprises two frequency storages 12 and 13 adapted in response to the processor 6 to be alternately adjusted to the transmitting frequencies of the frequency hopping transmitter determined in successive system cycle times. These frequency storages 12 and 13 are connected via an electronic switch 14 to the actual receiver path 15 and may thereby be selectively supplied to the receiver as heterodyne frequencies. Additionally, a signal detector 16 is provided for detecting whether or not a received signal is present at the instantaneously adjusted receiving frequency. This signal detector is connected to a logic circuit 17 which forms part of the receiver and in its turn controls the change-over switch 14. The frequency switch 14 is dimensioned such that it is capable of switching the intercepting receiver with a dead-time which is small relative to the system cycle time between the two stored frequencies which are stored in the frequency storages 12 and 13. This may be implemented, for instance, by means of a known ping-pong oscillator.

When an interception receiver according to FIG. 2 is used, the temporary storage 8 shown in FIG. 1 is extended by an additional system cycle time $T_S$ (total storage time=total dead-time of the system+$T_S$). Even though the dwell time $T_H$ of the frequency hopping transmitter is greater than the system cycle time $T_S$, gaps will be caused due to the fact that the hopping cycles of the frequency hopping transmitter and the measuring cycles of the FFT receiver are mutually asynchronous. These gaps will be particularly large when the dwell time $T_H$ is approximately equal to the system cycle time $T_S$. This is due to the fact that the frequency hopping transmitter changes its frequency during a large number of receiving cycles within the receiving period, with the interception receiver being unable during this time to follow the frequency hopping transmitter.

This effect may be eliminated when the FFT search receiver leads the interception receiver by a full system cycle and the temporary storage period is extended by said system cycle time, for in that case the FFT search receiver may store the next-following frequency hop already previously in the interception receiver. Storing occurs in the respective one of the frequency storages 12, 13 having the older frequency information, because said storage is not used at the time of storage for frequency definition of the interception receiver.

Therefore the frequency which will be occupied by the frequency hopping transmitter after its next-following jump is already known previously to the interception receiver, and instead of an unauthorized receiver it will become an authorized receiver provided the time of frequency change is also known. This coincides with the disappearance of the transmitter at the instantaneously received frequency. This information is evaluated by the additional signal detector 16 and the logic circuit 17 which controls the oscillator switch 14. The assembly 14, 16, 17 is dimensioned in such a way that upon disappearance of the monitored transmission it will switch the interception receiver 10 to the new, already stored frequency with a dead-time which is small relative to the system cycle time. Switching of the interception receiver between the two stored frequencies is performed by the logic circuit 17 on the basis of the following criteria: Either the received signal is present during the full system cycle, and in that case the interception receiver is switched at the start of a new system cycle, or the received signal disappears during the system cycle and in that case the interception receiver switches to the last-stored frequency at the time of disappearance of the received signal, and the frequency switching at the start of the next system cycle is suppressed.

Figure 3:
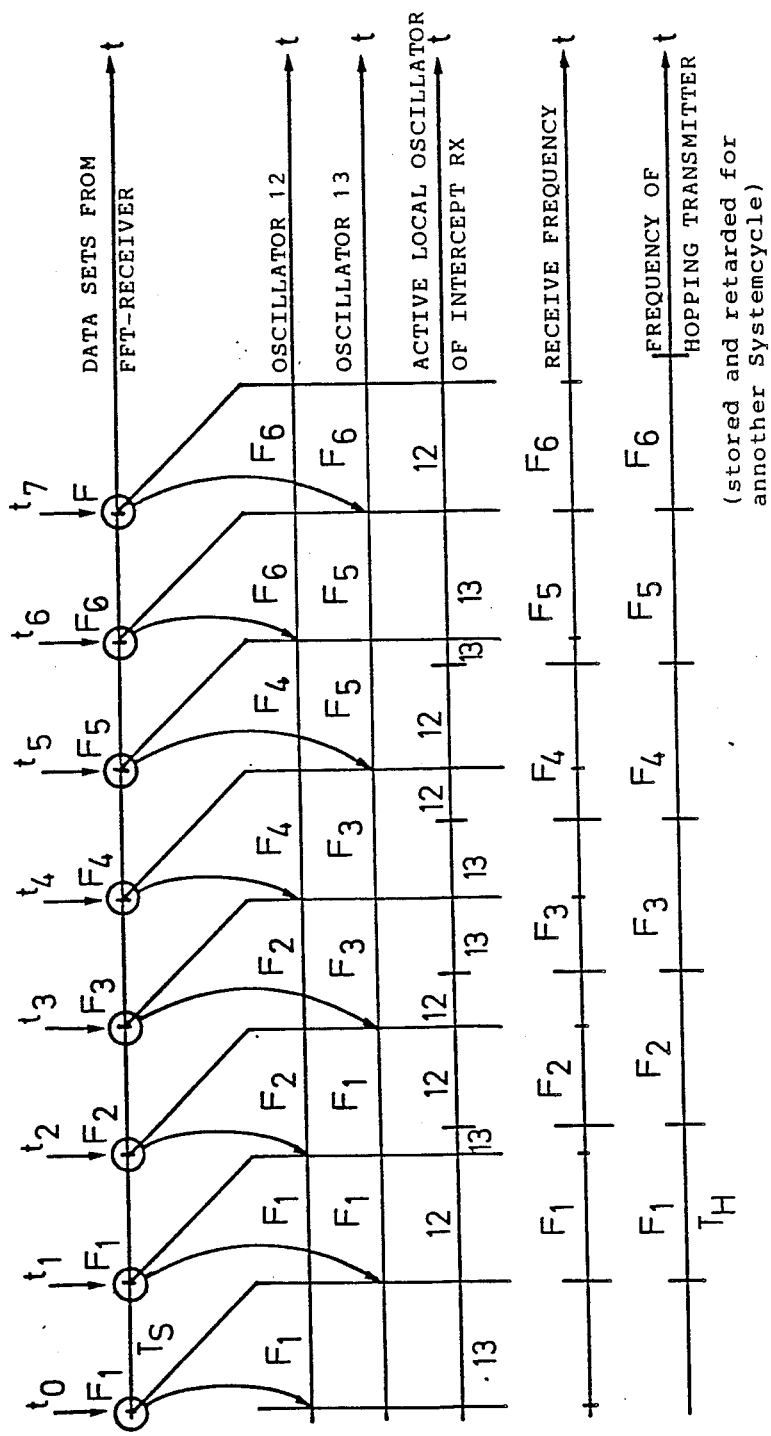
FIG. 3 is a flow chart showing that the performance of the system does not depend on a strict periodicity of the frequency shifting.

The flow chart of FIG. 3 illustrates the flow in case $T_S/T_H = 5/6$. For the sake of clarity the basic delay for bridging the FFT and the detection process has not been included in the diagram.

After each respective termination of a full system cycle of the duration $T_S$ the FFT search receiver determines the instantaneous frequency of the frequency hopping transmitter at the times $t_0$, $t_1$, $t_2$ etc. For instance, at the time $t_0$ the frequency $F_1$ is stored. Due to the signal delay the interception receiver at the time $t_1$ starts receiving at said frequency with the oscillator 12. The new frequency detected at the time $t_1$ and stored in the oscillator 13 is again $F_1$. Since the transmission at the frequency $F_1$ does not disappear during the receiving period $t_1$-$t_2$, the interception receiver is switched to the oscillator 13 when the cycle terminates at the time $t_2$.

The receiving frequency $F_2$ detected at the time $t_2$ is again stored in the oscillator 12. Let it be assumed that the received transmitter disappears during the receiving period $t_2$-$t_3$ because it changes its frequency shortly after the start of this machine cycle and hops to the new frequency $F_2$. In that case the logic circuit triggers the oscillator 12 as the operative oscillator, and the interception receiver follows the frequency hopping transmitter to the new frequency $F_2$. At the time $t_3$ the search receiver stores the next-following transmitting frequency $F_3$ in the oscillator 13. As it is a prerequisite that the dwell time of the frequency hopping transmitter is longer than the receiving period $t_2$-$t_3$, the oscillator 12 must remain operative beyond the time $t_3$. For this reason the logic circuit has to suppress switching of the receiver from the oscillator 12 to the oscillator 13 after termination of the system cycle $t_2$-$t_3$.

The flow chart of FIG. 3 shows that the performance of the system does not depend on a strict periodicity of the frequency switching. It is also possible to recombine transmitters with anisochronous frequency changes provided the minimum possible dwell time $T_{Hmin}$ is longer than the period $T_S$ of the system cycle.

Having regard to frequency hopping transmitters in which $T_H$ is smaller than $T_S$, the internal triggering of the switching operation can be turned off.

I claim:

1. A system for recombining a message transmitted by a frequency hopping transmitter operating in accordance with a predetermined frequency hopping program, including a predetermined dwell time, which is unknown at a receiving end of the system, comprising:

a digital FFT search receiver including a wire band receiving circuit for receiving an analog input signal and operating to convert the frequency band of the transmitter to an IF position, an analog-to-digital converter connected to said receiving circuit for converting the analog input signal into a digital signal, and a FFT processor connected to said analog-to-digital converter for determining, within a predetermined time window, the instantaneous frequency occupancy of the frequency band by determining at what frequency a complete data record is output by said analog-to-digital converter during a predetermined system cycle time which is the time between the generation of two complete successive records and which is shorter than the predetermined dwell time of the frequency hopping transmitter;

at least one interception frequency receiver connected to said FFT processor and operated thereby to switch the respective instantaneous transmitting frequency;

a digital storage means connected to said analog-to-digital converter for temporarily storing and delaying the digital signal; and a digital-to-analog converter connected between said digital storage means and said at least one instantaneous receiver for converting the stored digital signal into the original analog signal.

2. The system of claim 1, wherein:

said digital storage means comprising means for providing a delay time equal to the dead time of the FFT receiver including the setting time of said at least one instantaneous receiver.

3. The system of claim 1, wherein:

said digital storage means comprises means for providing a delay time equal to the dead time of the FFT receiver, including the setting time of said at least one instantaneous receiver, plus the predetermined system cycle time.

4. The system of claim 3, and further comprising:

first and second frequency storage means connected to said FFT processor for alternately storing transmitting frequencies of the frequency hopping transmitter;

a receiving signal detector connected to said interception receiver;

a switch connected between said interception receiver and said first and second frequency storage means; and a logic circuit connected between said receiving signal detector and said switch and operating to switch said interception receiver from said one frequency storage means to the other frequency storage means at the start of a new system cycle when the receiver frequency is present during the entire system cycle, and to switch the interception receiver to the frequency storage means having the last-stored frequency and suppressing frequency switching at the start of the next system cycle when the received frequency disappears during a system cycle.

* * * * *